(12) United States Patent
Vetromila

(10) Patent No.: US 7,464,480 B2
(45) Date of Patent: Dec. 16, 2008

(54) CRAFT BOARD ASSEMBLY AND METHOD OF USE

(76) Inventor: Sonsarae Vetromila, P.O. Box 607, Indian Hills, CO (US) 80454

( * ) Notice: Subject to any disclaimer, the term of this patent is extended or adjusted under 35 U.S.C. 154(b) by 0 days.

(21) Appl. No.: 11/359,283

(22) Filed: Feb. 22, 2006

(65) Prior Publication Data

US 2007/0193049 A1    Aug. 23, 2007

(51) Int. Cl.
    *G01B 3/00* (2006.01)
(52) U.S. Cl. .............. 33/436; 33/1 G; 33/1 K; 33/430
(58) Field of Classification Search .......... 33/436, 33/1 G, 1 K, 427, 430, 432, 434, 437, 438, 33/441, 443, 448, 483–487, 492, 493, 562, 33/563, 566, 1 AA, 494, 623; 269/289 R, 269/302.1, 303, 305
See application file for complete search history.

(56) References Cited

U.S. PATENT DOCUMENTS

| | | | | |
|---|---|---|---|---|
| 328,525 A * | 10/1885 | Shaver | ............... | 33/437 |
| 524,301 A * | 8/1894 | Benedict | ............... | 40/701 |
| 611,697 A * | 10/1898 | Lundy | ............... | 33/437 |
| 637,373 A * | 11/1899 | Crawford et al. | ............... | 33/427 |
| 658,072 A * | 9/1900 | Rich | ............... | 33/437 |
| 1,142,077 A * | 6/1915 | Buchanan | ............... | 33/443 |
| 1,334,145 A * | 3/1920 | Eaton | ............... | 33/483 |
| 1,338,951 A * | 5/1920 | Nadel | ............... | 33/277 |
| 1,417,753 A * | 5/1922 | Lineaweaver | ............... | 33/443 |
| 2,048,221 A * | 7/1936 | Redding | ............... | 33/437 |
| 2,219,766 A | 10/1940 | Cutterman | | |
| 2,805,479 A * | 9/1957 | Droste | ............... | 33/444 |
| 2,822,736 A * | 2/1958 | Padgett | ............... | 355/87 |
| 3,093,919 A * | 6/1963 | Holtz | ............... | 40/621 |
| 3,527,131 A | 9/1970 | Ellerin | | |
| 3,557,463 A * | 1/1971 | Perry et al. | ............... | 33/565 |
| 3,564,719 A * | 2/1971 | Feltenberger | ............... | 33/437 |
| 3,628,412 A * | 12/1971 | Rogers, Jr. | ............... | 83/455 |

(Continued)

OTHER PUBLICATIONS

Art Supply pages printed from an archived public website, published by Art Supply, having a publication date Aug. 16, 2004.*

(Continued)

*Primary Examiner*—G. Bradley Bennett
*Assistant Examiner*—Amy Cohen Johnson
(74) *Attorney, Agent, or Firm*—Leyendecker and Lemire, LLC; Kurt Leyendecker

(57) ABSTRACT

A craft board assembly is described. Embodiments of the craft board comprise a base having a self healing mat coupled thereto. A square frame rule is provided that defines an interior work area having predetermined dimensions. A piece of paper, such as a scrapbook page, that is the same size as work area dimensions can be received in the work area and is held securely in place by the interior edges of the square frame rule's sides thereby preventing lateral movement of the paper while it is being worked upon. A sliding ruler is also provided that spans two sides of the frame rule permitting a user to quickly and easily measure and layout a scrapbook page. Preferred embodiments further include a magnetic sheet underneath the self healing mat in conjunction with a steel sliding ruler to help hold the ruler securely in place at a desired position or location.

19 Claims, 7 Drawing Sheets

U.S. PATENT DOCUMENTS

| | | | | |
|---|---|---|---|---|
| 3,664,028 | A * | 5/1972 | Smith | 33/430 |
| 3,973,459 | A | 8/1976 | Stowe | |
| 4,116,426 | A * | 9/1978 | Kessler | 269/307 |
| 4,183,143 | A | 1/1980 | Root | |
| 4,577,415 | A * | 3/1986 | Schiller | 33/430 |
| 4,672,747 | A * | 6/1987 | Turner | 33/1 K |
| 4,819,338 | A | 4/1989 | Lategan | |
| 4,939,968 | A | 7/1990 | Stoof | |
| 5,077,904 | A * | 1/1992 | Michael | 33/432 |
| 5,309,642 | A | 5/1994 | McGinnis | |
| 5,383,503 | A | 1/1995 | Johnson | |
| 5,384,999 | A * | 1/1995 | Roche et al. | 52/764 |
| 5,459,937 | A | 10/1995 | Albin | |
| 5,653,035 | A * | 8/1997 | Chen | 33/484 |
| 5,819,422 | A * | 10/1998 | Schafer | 33/1 B |
| 5,829,150 | A | 11/1998 | McEligot | |
| 5,845,409 | A * | 12/1998 | Kimoto | 33/437 |
| 6,052,933 | A * | 4/2000 | Lytle | 40/711 |
| 6,098,515 | A * | 8/2000 | Daley, Jr. | 83/485 |
| 6,182,549 | B1 * | 2/2001 | Albright et al. | 83/454 |
| 6,418,635 | B1 * | 7/2002 | Nelson et al. | 33/563 |
| 6,606,810 | B1 * | 8/2003 | Doucet | 40/711 |
| 6,610,415 | B2 * | 8/2003 | Koslow | 428/553 |
| 6,895,675 | B2 | 5/2005 | Albright | |
| D561,826 | S * | 2/2008 | Lynen et al. | D19/27 |
| 2002/0134213 | A1 * | 9/2002 | Causse et al. | 83/565 |
| 2003/0073556 | A1 | 4/2003 | Carbone | |
| 2003/0116001 | A1 * | 6/2003 | Potter | 83/522.11 |
| 2003/0118689 | A1 * | 6/2003 | Carlson et al. | 425/811 |
| 2004/0143979 | A1 | 7/2004 | Albright | |
| 2004/0149108 | A1 | 8/2004 | McLean | |
| 2005/0223863 | A1 | 10/2005 | Volfson | |
| 2006/0192376 | A1 * | 8/2006 | Langford | 281/15.1 |
| 2006/0219078 | A1 | 10/2006 | Parrish | |
| 2006/0248764 | A1 * | 11/2006 | Spiegelberg | 40/594 |
| 2007/0101909 | A1 * | 5/2007 | Poyorena | 108/90 |

OTHER PUBLICATIONS

Thread Art pages printed from an archived public website, published by Thread Art, having a publication date Sep. 25, 2002.*

Internet Archive Wayback Machine pages printed from public website, to show the publication date of the Thread Art website.*

* cited by examiner

CRAFT BOARD ASSEMBLY AND METHOD OF USE

FIELD OF THE INVENTION

The present invention relates generally to a craft board for use in scrapbooking and other crafts.

BACKGROUND

In the past decade or so, paper crafts in general and scrapbooking in particular has become an extremely popular pastime in the United States. And scrapbooks have developed from simple depositories of photographs and other generally flat memorabilia to works of art in and of themselves.

Scrapbook pages are often comprised of fancy printed or textured paper on to which additional pieces of paper are adhesively or otherwise secured. The additional pieces can include mats for photographs pictures or other documents, accent lines, folded paper creations, booklets, lettering and die cut elements to name a few. Further, the base pages and ancillary papers can be folded and/or embossed to give the papers a more three dimensional appearance.

Scrapbooking has become big business with numerous stores in existence across the nation devoted primarily to selling scrapbooking materials and supplies. Classes are also available in most communities to teach the art of scrapbooking. Contests are held on the internet and through other venues awarding participants for the best original scrapbook pages. Numerous kits are available for purchase that provide all the fancy paper and instructions to make scrapbook pages of a particular design and configuration. Further, tools and other materials, such as but not limited to cutting devices, rulers, cutting boards and scoring tools, are marketed directly to scrapbookers.

Producing ornate scrapbook pages often requires a significant amount of layout measuring, scoring, folding and cutting. Depending on the page, a single error can appreciably detract from the visual appeal of a page and in certain circumstances, if the error relates to a critical feature or element, an entire page can be ruined.

Of the operations involved in producing a page, measuring often causes the greatest deal of aggravation and frustration. As a scrapbooker lays-out a page more quickly, the risk of making a measuring error increases substantially. Conversely, slowing down to double check and carefully verify each and every measurement can test the patience of many scrapbookers. The tools marketed to scrapbookers are typically those previously developed for other endeavors or other crafts. There are very few tools available that have been designed or created with the intent of facilitating both increased measuring accuracy and efficiency in the creation of ornate scrapbook pages.

DETAILED DESCRIPTION

Figure 1:
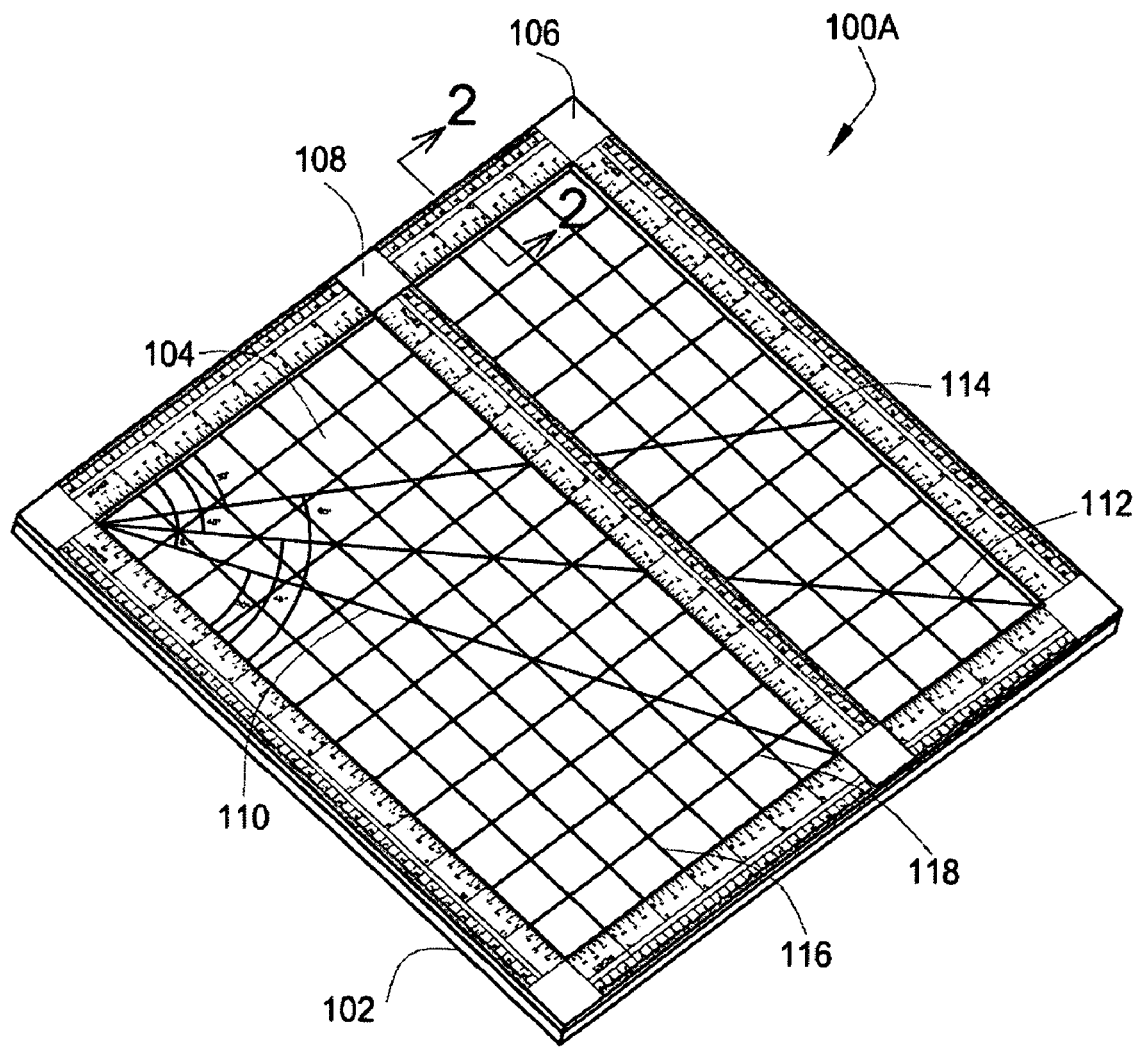
FIG. 1 is an isometric top view of a craft board assembly according to one embodiment of the present invention.

In embodiments of the present invention, a craft board assembly is described for use in scrapbooking, paper crafts and other crafts, such as but not limited to polymer clay working and beading. The board facilitates the efficient and error-free measuring, cutting and folding of paper and other craft materials.

In one preferred embodiment, the board assembly comprises: (i) a base having a slightly recessed center portion; (ii) a magnetic sheet material received in the recess: (iii) a sheet of self healing mat received on top of the magnetic sheet wherein the top surface of the grid is substantially coplanar with the non-recessed surface of the base; (iv) a square frame rule secured over the perimeter of the self healing mat and coupled with the non-recessed perimeter portion of the base, and (v) a slide ruler with ends adapted to rest on the top surface of the square frame rule and slide over the self-healing mat.

In certain variations, the dimensions of the exposed top surface (also referred to herein as the work surface or work area) of the self-healing mat that is bordered by the interior edges of the square frame rule corresponds to the dimensions of a sheet of paper such that the paper fits snuggly therein. Several common paper sizes used in scrapbooking include, but are not limited to, 6"×6", 8"×8", 9"×9", 11.5"×14.5", 12"×12", 12"×18", 12"×24", 24"×24", 24"×36 ". As is evident by the listed sizes, the work surface is square in certain variations and rectangular in other variations. By making the work surface substantially the same size as the primary size of the paper intended to be used therein, a piece of primary sized paper is held securely in place by the square frame rule edges and does not easily slide side to side or up and down when being laid out or cut.

It is to be appreciated that use of the craft board is not limited to paper the size of the work surface. To the contrary, an embodiment can also be used with any size paper that has dimensions smaller than those of the work surface. Typically, one corner of a paper is placed against and adjacent in a corner of the board to effectively prevent the paper from slipping or sliding in at least two directions during layout, cutting and/or folding operations. While the paper may be placed in any one of the board's four work surface corners, it will preferably be placed in the lower left hand corner of the work surface.

As implied by its name, the square frame rule has measuring scales inscribed, printed or otherwise marked on the top surface of each size. The scales are typically provided in English or Metric units or a combination thereof, although other embodiments and variations can use alternative or even arbitrary units of measure. Because scrapbookers are often required to measure from locations relative to the midpoints of the sides of a paper, the markings on each side of the square frame rule are numbered outwardly of each side's midpoint in certain variations. In other variations, the markings are numbered from left to right and from bottom to top. Further, in certain embodiments, the markings are numbered in more than a single way.

The self-healing mat typically includes grid lines that correspond to particular marks on the square frame rule scales. For instance, when the English scale is utilized a grid having one inch spaced vertical and horizontal lines can be marked on the mat. The grid lines help a user judge whether a paper is square especially when an edge of the paper is not adjacent and butted up against an edge of the square frame rule. Angled gridlines can also be provided typically at commonly used angles, such as 30 degrees, 45 degrees and 60 degrees to help a user fold, cut or mark a paper accordingly.

Generally, the slide ruler fits snugly between opposite edges of the square frame rule and is in contact with the work surface. In preferred variations, thinner end portions of the ruler over hang the sides of the square frame rule. In embodiments where the work surface is square, the slide ruler can be orientated vertically or horizontally to facilitate measuring, scoring or cutting in both principle directions. In preferred variations, the ruler is steel or includes magnetic sheet material adhered to its bottom surface to facilitate an attraction between the magnetic sheet underneath the self healing mat thereby more firmly holding the ruler in a desired location, but also permitting a user to quickly move the ruler to multiple locations as a paper is laid out, cut or scored. The steel ruler is further resistant to damage caused by a cutting blade or knife. In other variations, plastic slide rulers can be used with or without a magnetic backing and steel edges.

Embodiments of the craft board can be used to craft ornate scrapbook pages more quickly and with less measuring related errors than with prior art tools and techniques. Because the work surface securely holds a full sized scrapbook page therein and the page abuts all edges of the surrounding square frame rule, the user can measure off of any side without worry of introducing tolerance errors typically associated with measuring from more than one reference point or line. The sliding ruler can be moved quickly up and down and left and right over the work surface while maintaining it square disposition relative to the scrapbook paper. Accordingly, unlike with a typical prior art ruler where multiple points of a certain distance from a reference edge must be measured before marking a line that is parallel to the reference edge, a user of the craft board need only move a slide rulers edge to an appropriate position along two sides of the square frame ruler and appropriately mark, score, or cut the line using the slide rulers edge as a guide.

Further, while scrapbookers using traditional tools typically lay out their pages by marking positioning lines, cutting lines and scoring lines in pencil, which often require subsequent erasing, The sureness of which the slide ruler is held in a position, as well as, the confidence that any chosen position is correct and square permits the user to forgo pencil marking and directly cut or score a paper in many if not most circumstances.

Folding of paper is also made more efficient and more accurate using embodiments of the board. For example, to a paper to be folded in half on the diagonal, a user places the lower corner of the paper flush against the intersection location of the left and bottom inner edges of the square frame rule. These two edges hold the paper in place while the user folds the opposing corner up and over the lower corner until the upper corner is also flush against these two edges. The user then uses a finger or a creasing tool, such as a bone folder, to form the fold crease. While this type of fold and other similar folds can be performed without the board, it is difficult to get the upper and lower corners and the corresponding edges to align with minimal skew and error.

While embodiments of the craft board are primarily described herein in context of its use in scrapbooking, it is appreciated that embodiments can be used in conjunction with many other crafts as would be obvious to one of ordinary skill in the art given the benefit of this disclosure. For instance, embodiments are useful in many paper crafts, such as card, booklet, or box making wherein layout measuring and/or folding is required. The board can be used in other non-paper crafts, such as beading, quilting, quilting, origami folding, rubber stamping and polymer clay working, wherein measuring and layout are important.

Numerous variations and alternative embodiments of the board are contemplated. In the described and illustrated embodiments, the square frame rule is a distinct component relative to the base. In other variations the base and the square frame rule can be integrally fabricated, wherein the scale markings are printed on the appropriate surfaces later and/or are integrally molded into the surfaces during fabrication.

Other variations and alternative embodiments can be provided without the magnetic sheet and/or steel sliding ruler. For instance in one alternative embodiment, the sliding ruler can be plastic with no magnetic sheet included under the self-healing mat. In another embodiment, the magnetic sheet can be replaced with a steel plate and the sliding ruler can include a magnet or magnetic sheet material on its bottom surface. In yet another variation, a magnetic sheet can be provided underneath the square frame rule or the square frame rule can comprise a magnetic material such that the magnetic holding force is applied to the sliding ruler at its overhanging ends. Other variations are possible as well as would be obvious to one of ordinary skill in the art given the benefit of this disclosure.

As shown in the illustrated embodiments, a self-healing mat is provided to permit a user to cut paper or other materials directly on the board without the mat becoming quickly unusable. In other alternative embodiments, the self-healing mat can be replaced with other materials suited for a particular use of the board. For instance, in bead work it may be desirable to have a surface that receives tacks so that a user can tack down the end of a string that is to have beads threaded thereon, accordingly a cork mat can be provided in place of the self-healing mat. In other variations, a user may need a board for adhesive bonding of various craft elements together, so a mat made of Teflon or some other non-stick material can be provided. In one variation of the illustrated embodiments, additional mats or pieces of sheet material can be provided to be placed over the self-healing mat. For example, a thin disposable and clear plastic sheet can be provided to cover the self-healing mat when a user is bonding paper or other craft materials together on the board.

Terminology

The terms and phrases as indicated in parenthesis (" ") in this section are intended to have the meaning ascribed to them in this section applied to them throughout this document including the claims unless clearly indicated otherwise in context.

The term "or" as used in this specification and the appended claims is not meant to be exclusive rather the term is inclusive meaning "either or both".

References in the specification to "one embodiment", "an embodiment", "a preferred embodiment", "an alternative embodiment", "embodiments", "variations", "a variation" and similar phrases means that a particular feature, structure, or characteristic described in connection with the embodiment(s) or variation(s) is included in at least an embodiment or variation of the invention. The appearances of the phrase "in one embodiment" or "in one variation" in various places in the specification are not necessarily all referring to the same embodiment or variation.

The terms "rule" and/or "ruler" refers to any device having a measuring scale marked thereon. Typically, although not necessarily, the markings extend to or proximate at least one edge of the device. The measuring "scale" can be in English, metric or any other suitable units. As used herein a "ruler" or "rule" may be marked or molded onto or into another device or component, such as, for instance, a base board.

A "square frame rule" as used herein refers to a rule having four sides that are square to each other wherein each side (i) includes an inwardly facing substantially straight edge, and (ii) has a scale marked thereon. All the sides can be the same length as each other or two opposing sides may be longer than the two other opposing sides. The "square frame rule" typically comprises a single unitary piece but variations are contemplated wherein the "square frame rule" comprises two or more separate rules forming the sides that are square to each other.

The term "paper" as used herein refers to any thin sheet that is generally flexible.

The term "couple" or "coupled" as used in this specification and the appended claims refers to either an indirect or direct connection between the identified elements, components or objects. Often the manner of the coupling will be related specifically to the manner in which the two coupled elements interact.

"Self-healing mat" refers to a polymeric sheet wherein cuts into the sheet tend to join back together rather than form divots or other surface imperfections that could hinder a user's ability to draw straight lines or make straight cuts. Typically, self-healing mats are made from three plies of PVC although self healing mats can be made from any suitable material in any suitable number of plies.

"Magnetic sheet material" or "magnetic sheet" as used herein refers to any sheet material that is magnetic or subject to magnetic attraction whether the sheet material is generally flexible, such as polymer based magnetic sheet, or rigid such as a piece of sheet steel.

The term, "rectangle" as used herein is defined as a parallelogram all of whose angles are right angles. A "square" is a rectangle wherein the length of each side is of the same length as every other side.

A Craft Board Assembly According to One Embodiment of the Present Invention

Figure 2A:
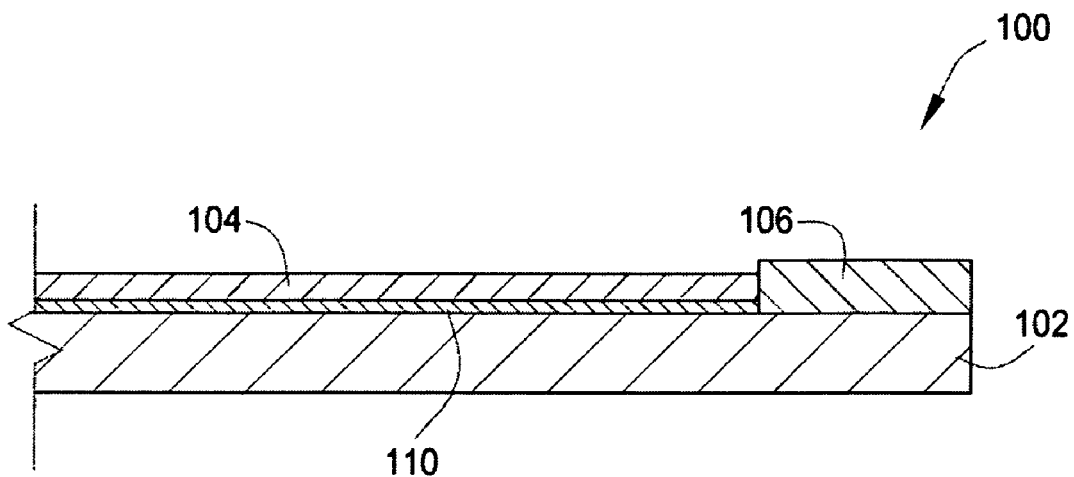
FIG. 2A is a cut away view of a craft board assembly taken along line 2-2 of FIG. one illustrating a first variation of one embodiment of the present invention.
Figure 3:
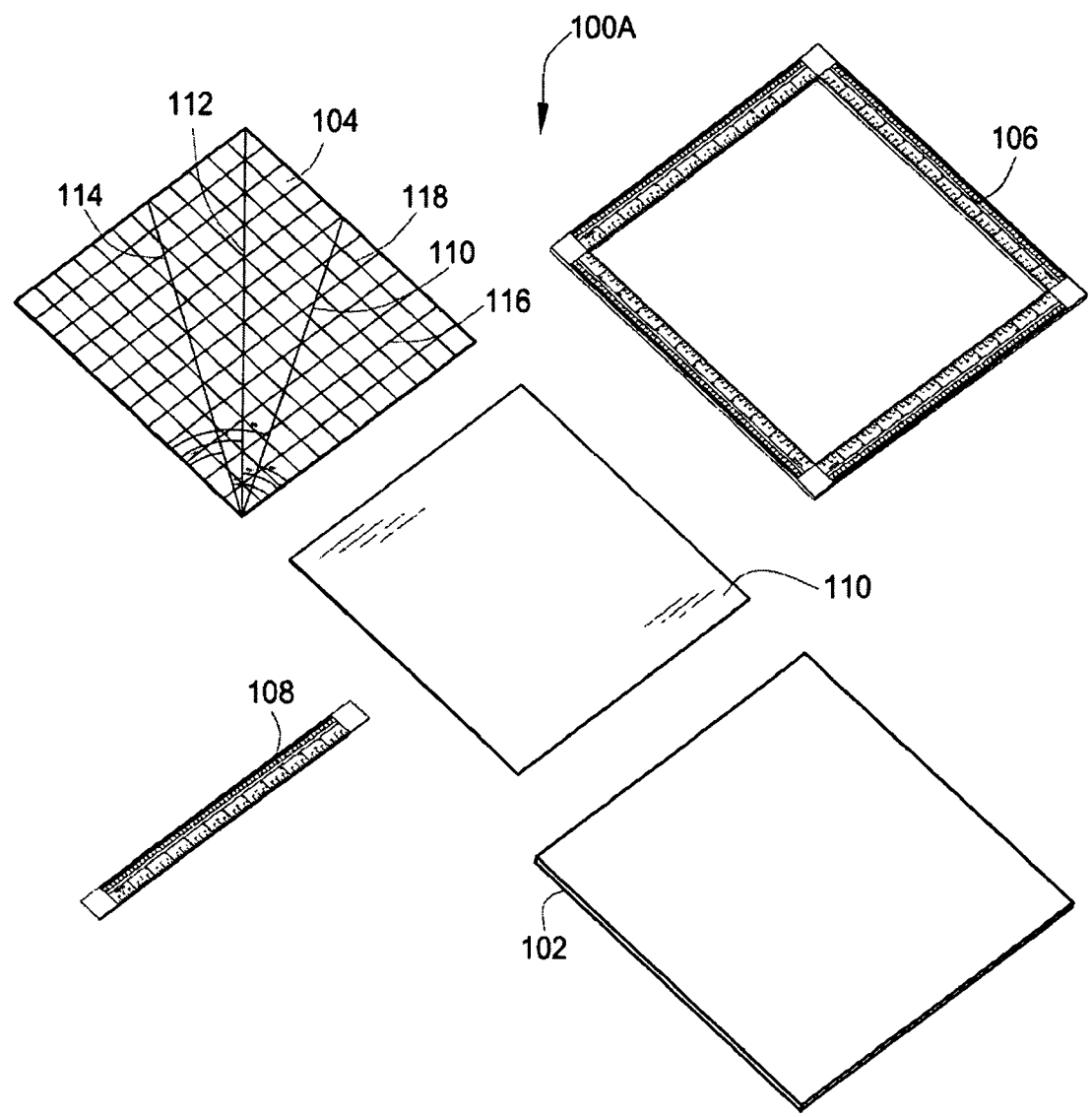
FIG. 3 is an exploded isometric view of a craft board assembly according to one embodiment of the present invention.

FIGS. 1, 2A, 3-6 illustrate an exemplary craft board assembly 100A and its various components. Referring primarily to FIG. 3, the craft board assembly comprises: (i) a base 102; (ii) a piece of magnetic sheet material 110; (iii) a self healing mat 104; (iv) a square frame rule 106; and (v) a sliding ruler 108 that includes end portions 120 (see FIGS. 4A & B) that over hang top surfaces of opposing parallel sides of the frame rule and a thicker center portion 122 that rests in contact with the top surface of the self-healing mat.

The base 102 is typically fabricated of a plastic material by any suitable manufacturing process including but not limited to extruding and injection molding. The base 102 can, however, be made of other materials including wood products, composites and metal. A partial cross section of the base is illustrated in FIG. 2A.

The magnetic sheet material 110 is typically comprised of a flexible polymeric sheet filled with magnetic particles. One manufacturer of suitable flexible magnetic sheet is Flexmag Industries, Inc. of Marietta, Ohio although many others exist. The magnetic pull strength of the mat can vary in different embodiments and variations but usually it does not need to be very high. Rather, the purpose of the magnetic sheet is not only to gently hold the sliding ruler in a desired location but also permit the user to easily and quickly move the sliding ruler from location to location as a scrapbook page is laid out. Typically, although not necessarily, the magnetic sheet material is bonded to and centered on the top surface of the base 102 with a thin layer of adhesive. In variations, the magnetic sheet material can also comprise a piece of sheet steel or a magnetized ceramic sheet, which need not be flexible.

The self-healing mat 104 is typically bonded to the magnetic sheet material 110 using a thin layer of a suitable adhesive. In some variations, the mat and magnetic sheet are provided as an integral sheet having a thickness less than the thickness of the square frame rule 106. In other variations, the mat is separate from the magnetic sheet and later joined or just laid upon the magnetic sheet and not permanently bonded thereto to permit easy removal and possible replacement of the self-healing mat.

The self-healing mat 104 is typically comprised of a three ply PVC material, although other polymers and ply configurations can be used in variations. One, although not the only, suitable supplier of self-healing mat is Fiskars Brands, Inc. of Madison, Wis. The top surface of the mat can include horizontal and vertical grid lines 116 & 118 printed thereon. Preferably, these grid lines correspond to markings on an associated square frame rule 106. For instance, when English units are the primary scale used on the frame rule, the horizontal and vertical grid lines will typically be spaced 1" from each other respective horizontal and vertical grid line with each line aligning with an inch marking on the square frame rule.

As also illustrated in FIGS. 1 and 3, several angled grid lines 110, 112 & 114 can be printed on the surface of the self-healing mat 104. Typically, these lines will comprise commonly used angles such as but not limited to 30 degrees, 45 degrees and 60 degrees and will emanate proximate one corner of the mat, such as its lower left hand corner.

Figures 5, 6:
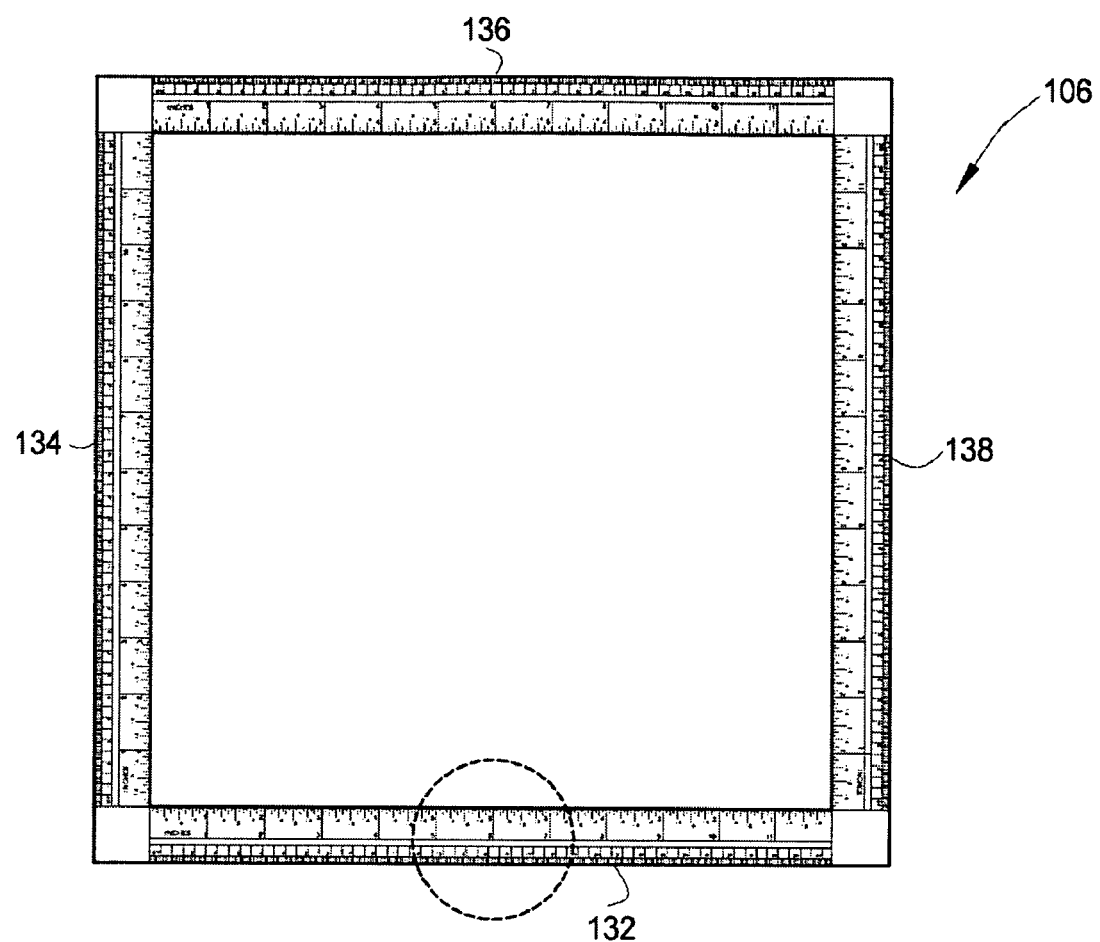
FIG. 5 is a top view of a square frame rule of the craft board assembly according to one embodiment of the present invention.
FIG. 6 is a close-up of one side of the square frame rule of FIG. 5 according to one embodiment of the present invention.
Figure 7:
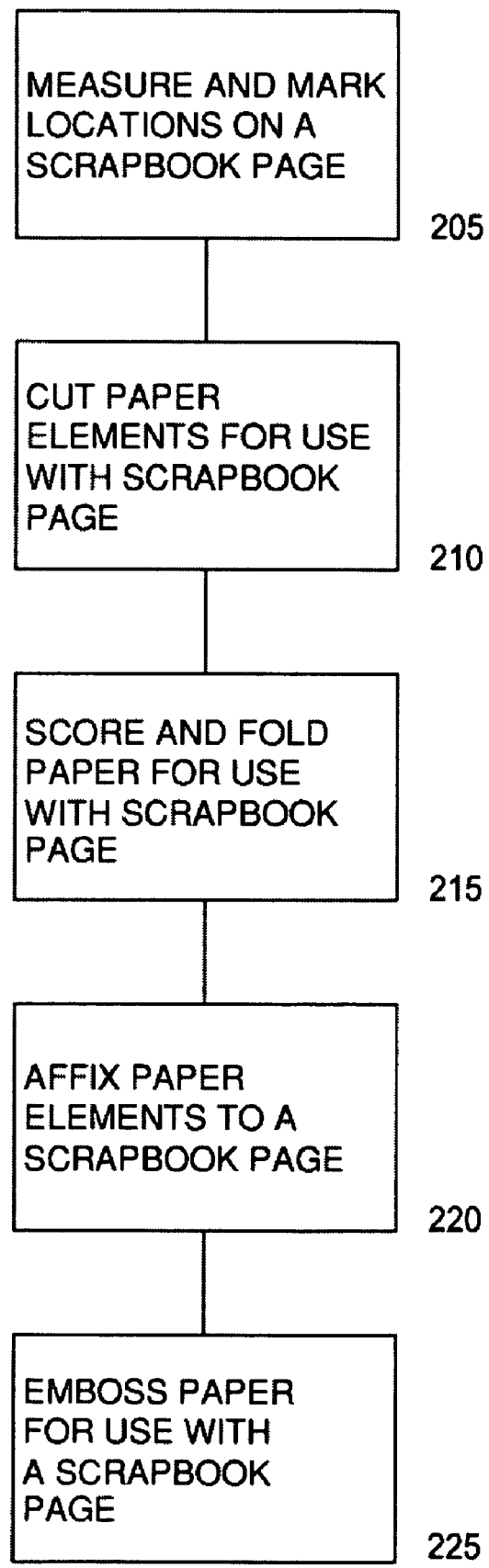
FIG. 7 is a flow chart illustrating a methodology of creating scrapbook pages according to one embodiment of the present invention.

The square frame rule 106 is typically made of plastic, wood or metal and is secured to the base 102 proximate its perimeter using any suitable means including but not limited to adhesive bonding, and mechanical fastening. Scales 144 & 146 (as shown in FIGS. 5 and 6) are marked on the top surface of each side 132-138 of the rule in any desirable units. In the square frame rule illustrated in FIGS. 5 & 6, an English unit scale 144 is provided proximate each side's inside edge and a metric unit scale 146 is provided proximate the exterior edge. Of course, the manner in which the scales are marked on the rule can vary as the manner in which the marked units are numbered. As shown in FIGS. 5 & 6, the inch marks of the English unit scale 144 on each side are numbered from 0 to 12 inches 152 left to right for the horizontal sides 132 & 136 and bottom to top for the vertical sides 134 & 138. Further, the inch marks of each side are numbered outwardly and in descending order from 6 to 0 inches 150 from the center of the side. Accordingly, a user of the board can measure locations on a paper in the traditional manner from left to right or from bottom to top, but the user can also measure inwardly from the right to left and top to bottom using the set of number 150 that extend from 6-0 from each side's center.

By having the inch marks (or other units in other variations) from the center of each side, a scrapbooker can more quickly layout a page that requires measuring and/or marking relative to either of a page's edges.

Figure 4A:
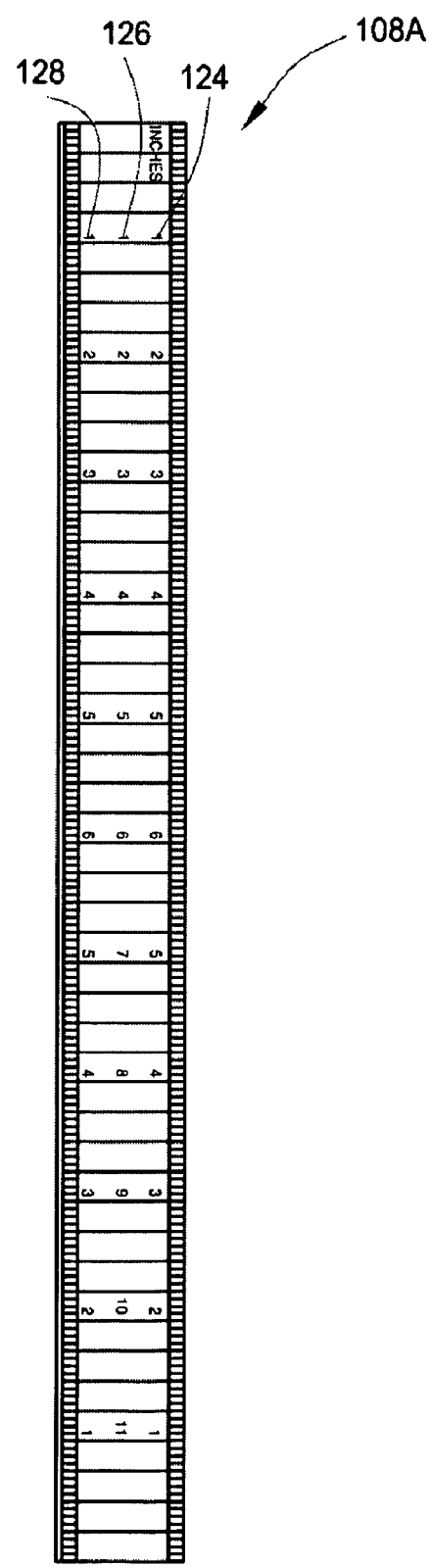
FIG. 4A is an isometric top view of a slide ruler of the craft board assembly according to one embodiment of the present invention.

Referring to FIGS. 1 and 2A, it is noted that the inner edges of square frame rule 106 form the edges of the craft board's work surface. Preferably, these edges prevent a paper butted up against one or more of the edges from sliding while a user is marking, cutting or folding a paper. Accordingly, there should be no gap between the top surface of the self healing mat 104 and the inner portion of the frame rule so that the edge of a paper page can not slide therebetween. Adhesive can be applied to the entirety of the frame rule such that it also bonds to the top surface of the base 102 Two typical sliding rulers 108A & B are illustrated in FIGS. 4A & B. One ruler 108B includes a thicker center portion 122 having a width substantially equivalent to the distance between opposing inner edges of the frame rule 106, and two thinner side portions 120 that overhang the top surface of the frame rule. Accordingly, the ruler is held in a substantially perpendicular orientation relative to the two sides of the frame rule that it spans, and further, it can move freely upwardly or downwardly or leftwardly or rightwardly while maintaining its perpendicularity to the associated frame rule sides. In craft board embodiments having a substantially square work area, a single sliding ruler can be used to span both the vertical sides and the horizontal sides of the frame rule; however, for rectangular work areas different size sliding rulers are typically required for each pair of sides.

The other ruler 108A, as specifically illustrated in FIG. 4A, does not include the overhanging portions but rather fits between opposing inner edges of the frame rule 106.

In certain embodiments, the sliding rulers 108 are comprised of steel to facilitate the sliding ruler's attraction to the magnetic sheet material 110 and to prevent the straight edges of the ruler to become nicked, gouged or otherwise damaged when the edges are used as a guide for a cutting blade or knife. In variations, however, the ruler can be primarily comprised of a plastic material and include a magnetized bottom layer. Preferably, any plastic ruler would also include steel edges to prevent damage to the ruler even used as a guide for a cutting blade or knife.

FIG. 4A illustrates a sliding ruler 108A that has an inch scale with marks that extend fully across width of the ruler such that a user can use either side when laying out a page. The inch marks on the scale are numbered in several ways to provide greatest ease for a user in measuring a scrapbook page. The outermost number sets on top and bottom 124 & 128 start with a 6" location in the middle of the ruler and number the inch marks on either side sequentially outwardly therefrom 6 to 0 at the end thereof. With the inner number set 126, the inch marks are numbered 1-12 from left to right.

Figure 4B:
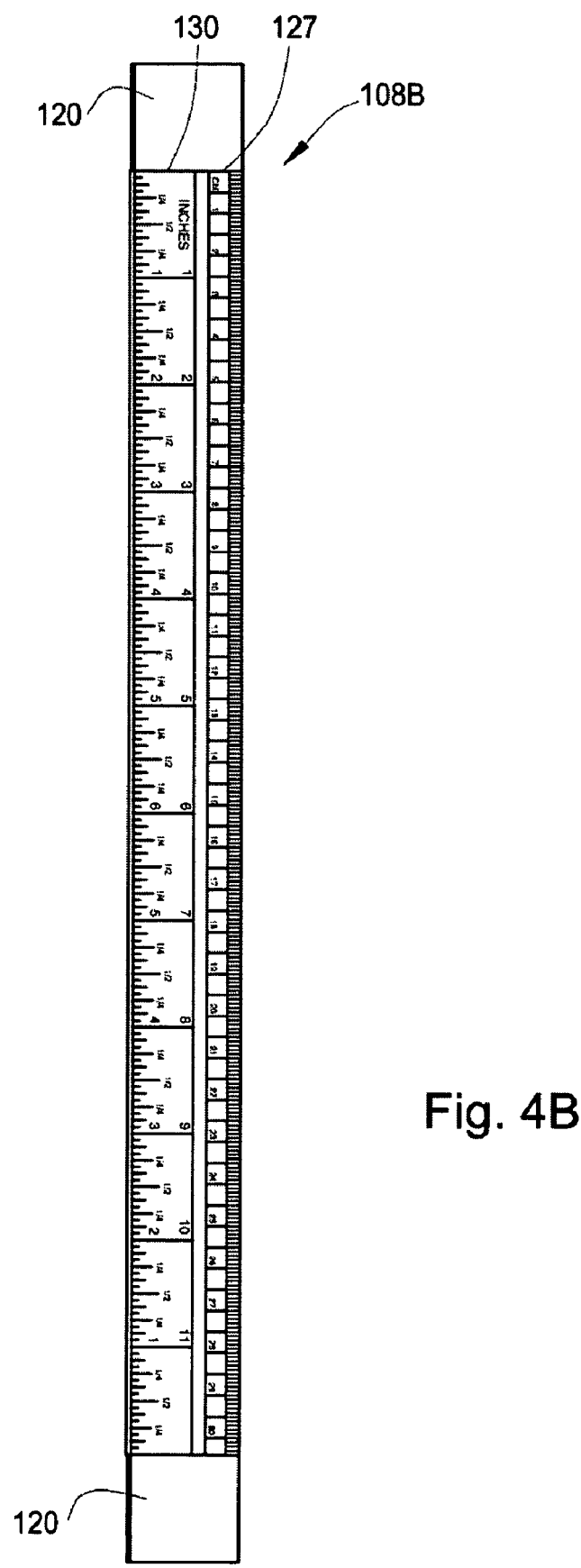
FIG. 4B is an isometric top view of another slide ruler of the craft board assembly according to one embodiment of the present invention.

FIG. 4B illustrates a sliding ruler 108B that provides both a metric scale 127 and an English scale 130 with the bottom English scale including both center out numbering and right to left numbering. The metric scale, as shown, provides left to right numbering for centimeter marks, although in variations the mark could be number outwardly from the center as well. The outer portions 120 of this ruler permit a user to accurately align either the top or bottom longitudinal edges of the ruler 108 with the markings of the metric scale 148 or any other scale in variations that is provided on the outside edge of the square frame rule 106. Without the overhanging outer portions, the outer scale markings would be useful for general reference only and not for accurate measurement.

A Craft Board Assembly According to Another Embodiment of the Present Invention

Figure 2B:
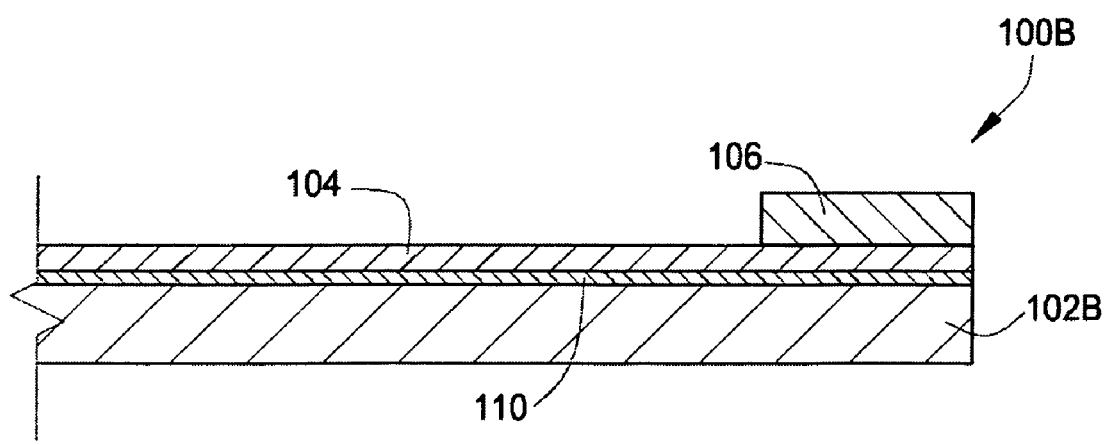
FIG. 2B is a cut away view of a craft board assembly taken along line 2-2 of FIG. one illustrating a second variation of one embodiment of the present invention.

FIG. 2B illustrates a cross section of another embodiment craft board 100B. This embodiment uses a flat base 102 similar to the base of the one embodiment described above that like the previously described embodiment can be constructed of a fiberboard product although it can be made from one of a number of materials as would be obvious to one or ordinary skill in the art given the benefit of this disclosure. The optional magnetic sheet material 110 covers substantially the entire board as shown and is typically secured to the board with a suitable adhesive. The self-healing mat 104 also covers substantially the entire board and is typically secured to the magnetic sheet material with a suitable adhesive. The square frame rule 106 is secured directly to the perimeter of the self healing mat typically with a suitable adhesive. In one variation the various layers can be mechanically fastened together using rivets, screws and/or studs that pass through the magnetic sheet material and the self-healing mat and terminate at the frame rule and the base at respective ends thereof. One or more sliding rulers 108A & B can also used with this embodiment.

Method of Using a Craft Board to Construct Scrapbook Pages According to an Embodiment of the Present Invention While the embodiments of the craft board can be used in conjunction with a wide variety of crafts, certain embodiments are especially suited for use with the craft of scrapbooking. FIG. 6 is a flow chart indicating various operations a scrapbooker might perform using embodiments of craft board while creating a particular scrapbook page. It is to be appreciated that not all of these operations will be performed for every page created. Further, the order in which operations are performed will depend on the particular layout and configuration of a page.

The most common operation carried out in scrapbooking is measuring and marking as indicated in block 205. The most commonly used page size in scrapbooking is 12"×12" although several other sizes are available. One embodiment of the craft board has a work surface that is 12"×12" and securely receives a 12"×12" page therein to prevent the page from moving upwardly, downwardly, or to the left or the right. Other variations can be provided that have work surface dimensions that match other scrapbook page sizes. To locate a point on a page, the user simply slides the sliding ruler 108 upwardly or downwardly between vertical sides of the square frame rule 106 to the desired position as indicated by the scale markings on both of the vertical sides. Next, the user locates the left to right position of the point by finding the desired location on the scale marked on the sliding rule. The user can mark the location with a pencil or by other means. Alternatively, if the location is a reference for affixing an element to the page, the user may directly affix the element with an adhesive or by other means using the edge of the sliding scale as a reference line. Of course, a similar process for finding a point can be performed with the sliding ruler in a vertical orientation between the horizontal sides of the square frame rule.

To locate a horizontal or vertical center line location of a scrapbook page, a user need not align a ruler with the edge of a page and then measure 6 inches therefrom. Rather, the user only needs to reference a centered 6 mark on the square frame rule 106. Further as described above, a user can measure outwardly of a center location to locate and/or mark locations relative to the center location without having to perform addition and subtraction to determine the locations position relative to an edge of the paper as would be required using traditional rulers.

A typical finished scrapbook page includes a number of paper elements that are affixed to the page, such as but not limited to framing elements or mats for photographs, paper strips and geometric shapes. These paper elements are typically cut from rectangular or square pieces of paper that are smaller than the scrapbook page as indicated in block 210. To cut a strip from such a piece of paper the user places a corner of the paper and its corresponding edges against inner edges and an edge intersection point of the frame rule while laying the paper on the board's work surface. Next, the user places the sliding ruler over the paper and positions it at a location wherein the ruler's edge is located a desired distance from an exposed edge of the paper. Holding the ruler in place, the user then cuts the strip using the edge with a craft knife or other cutting implement using the edge of the ruler as a guide for the knife. To cut another strip the user simply moves the ruler over the desired amount as measured by scale markings on the square frame rule and cuts the next strip in the same manner. The process is also similar for cutting rectangular or square pieces except that the user may need to move the sliding ruler between vertical and horizontal orientations.

Another operation very regularly undertaken in the creation of a scrapbook page is folding as indicated in block 215. Using prior art techniques to create a fan fold, a user (i) marks the fold lines after locating them using a ruler, (ii) scores the fold lines often using a scoring board and a scoring tool, (iii) folds the paper along the scored line, and (iv) if the fold lines are to be visible, erases the pencil marks. In contrast using embodiments of the craft board, the user need only (i) place paper on the work surface, (ii) locate each fold line location using the sliding ruler and immediately score the line by running a scoring tool along edge of the sliding rule, and (iii) with an edge of the paper braced against an inner edge of the frame rule to prevent the paper from sliding, fold the paper. Accordingly, the craft board embodiment offers several advantages: (a) the user need not mark the paper saving an operation and increasing efficiency; (b) the user need not line up the marked line with a groove of a scoring board before scoring with a scoring tool also saving time and also avoiding errors introduced because of improper alignment; and (c) the paper does not slide around while being folded permitting faster folding and straighter fold lines. It is to be appreciated that the self-healing mat has a low enough durometer to give slightly when pressure is applied to it such that lines can be scored thereon with a scoring tool without having to use a scoring board.

Accurate diagonal folds on square pieces of paper and half folds on rectangular or square pieces of paper can be accomplished with efficiency and a high degree of accuracy using embodiments of the craft board. Concerning a diagonal fold, for instance, a user first places a corner of the paper against an interior corner of the square frame rule. Next, the user carefully folds an opposing second corner of the paper over onto the first corner such that the second corner is also braced against interior corner of the square frame rule. Finally using a finger or a bone folder, the user creases the fold. Advantageously, by butting the corners of the paper into the corner of the square frame rule extremely accurate alignment is facilitated.

As indicated in block 220, scrapbookers will often affix, usually with adhesive, letters or other decorative elements to a page. Often it is desirable for the elements or letters to be aligned relative to each other. Most often the lines along which letters or elements are aligned and placed are themselves preferably parallel or perpendicular to an edge of the associated page. Locating a placement line that is perfectly parallel to an edge of the paper can be time consuming traditionally requiring a user to measure two points the desired distance from an edge and using a ruler to connect the points and form the placement line. Even minor measuring errors can cause the placement line to be several degrees off of parallel. Finally, once the letter or elements are placed, the pencil placement line usually has to be erased which requires additional time. With embodiments of the craft board, the user simply locates the desired placement line using the sliding ruler and because the magnetic sheet holds the ruler in place, the user can accurately and quickly place letters or other elements against the edge of the sliding rule without having to draw the line in pencil. As a side note to further ensure the sliding ruler does not move, the user can also or alternatively tape the ruler in place to the square frame rule at the ruler's overhanging end portions 120.

Another operation often used in the creation of scrapbook pages is embossing as indicated in block 225. As noted above, the self-healing mat used in certain embodiments gives when pressure is applied thereto. Accordingly, by placing an embossing template on top of a paper received on a board's work surface and applying pressure to the paper inside the template will effectively emboss the paper.

It is to be appreciated that the aforementioned operations and described examples are not to be considered exhaustive. Rather, the scrapbooking operations and other craft activities that can be performed more easily and more efficiently with embodiments of the board over traditional prior art methods is nearly endless and limited only by the creativity of its users.

Alternative Embodiments and Other Variations

The various preferred embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art given the benefit of this disclosure. All variations of the invention that read upon the appended claims are intended and contemplated to be within the scope of the invention.

For instance, the square frame rule can be replaced with four separate rulers that each extends the length of one side of an alternative embodiment craft board. In another variation, two two-sided square rules can be used in place of the square frame rule as well.

In other variations of the described embodiments, the craft board assemblies can include other measuring and layout tools such as angles, marked with measuring scales or not to be used in addition to the sliding rulers.

In at least one alternative embodiment, the invention need not include a board at all. Rather, the alternative embodiment comprises the square frame rule with or without an associated sliding ruler that a user can use with her own work surface. In yet another embodiment, the square rule can be integrally molded as part of the base.

I claim:

1. A craft board assembly comprising:
 a base assembly including a rectangular work area, the work area having a substantially flat horizontal surface comprising a self healing mat; and
 a square frame rule having four sides, each side including (i) a substantially vertical inwardly facing edge, and (ii) a top surface with a first measuring scale marked thereon, each of the four inwardly facing edges being in direct contact with the flat horizontal surface and rising vertically upwardly relative thereto defining boundaries of the work area, the square frame rule being affixed to the base assembly;
 wherein the first measuring scale on at least one side of the square frame rule is numbered both outwardly and in descending order from a number 6 mark located substantially at the longitudinal center of the side and upwardly from a zero mark located substantially at an end of the inwardly facing edge of the side.

2. The craft board assembly of claim 1, further comprising:
a sliding ruler, at least a portion of the sliding ruler adapted to be received vertically in-between two opposing inwardly facing edges of the four inwardly facing edges and spanning substantially the distance between the two opposing inwardly facing edges to substantially prevent significant movement of the sliding ruler in a direction substantially perpendicular to the two opposing inwardly facing edges and permit lateral movement in a direction substantially parallel to the two opposing inwardly facing edges.

3. The craft board assembly of claim 1, wherein the base assembly further comprises a base board beneath the self-healing mat.

4. The craft board assembly of claim 1, wherein a plurality of grid lines are marked on a top surface of the self-healing mat and each grid line is substantially aligned with and extends in a substantially similar direction as a marking of a first measuring scale of at least two of the four sides.

5. The craft board of claim 1, wherein the first measuring scale on each side of the square frame rule comprises an English scale.

6. The craft board assembly of claim 1, wherein at least one side of the square frame rule includes a second measuring scale marked thereon, the second measuring scale comprising a metric measuring units.

7. The craft board of claim 1, wherein the work surface is substantially square with the dimensions of the work surface being 12 inches by 12 inches.

8. The craft board of claim 1 further comprising:
a sliding ruler having at least a second measuring scale marked thereon, the sliding ruler being at least partially comprised of one of a magnetic and ferritic material and including at least one metallic longitudinal edge;
wherein the base assembly comprises (i) a base board, (ii) a magnetic sheet disposed on a top surface of the base board, and (iii) the self-healing mat disposed on a top surface of the magnetic sheet.

9. A method of creating a scrapbook page using a craft board assembly, the craft board assembly including (a) a rectangular work area, the work area having a substantially flat horizontal surface comprising a self healing mat, the self healing mat including a plurality of grid lines marked thereupon (b) a square frame rule having four sides, each side including (i) a substantially vertical inwardly facing edge, and (ii) a top surface with a first measuring scale marked thereon, The four inwardly facing edges in direct contact with the flat horizontal surface and rising vertically upwardly relative therefrom to define boundaries of the work area, and (d) a sliding ruler, at least a portion of the sliding ruler adapted to be received vertically in-between two opposing inwardly facing edges of the four inwardly facing edges and spanning substantially the distance between the two opposing inwardly facing edges to substantially prevent significant movement of the sliding ruler in a direction substantially perpendicular to the two opposing inwardly facing edges and permit lateral movement in a direction substantially parallel to the two opposing inwardly facing edges, the sliding ruler further having a second measuring scale marked on a top surface thereto the method comprising:
placing a scrapbook paper into the work area, the scrapbook paper having substantially the same dimensions as the work area bounded by the four inwardly facing edges wherein the four inwardly facing edges substantially inhibit horizontal movement of the scrapbook paper; and
finding a plurality of locations on the scrapbook paper using one or more of the first measuring scale located on each of the four sides and the second measuring scale of the sliding ruler; and
positioning one or more secondary elements on the page at one or more locations of the plurality of locations and affixing one or more secondary elements to the page.

10. The method of claim 9, further comprising:
cutting at least one of the scrapbook paper and the one or more secondary elements by guiding a knife or cutting tool along an edge of the sliding ruler.

11. The method of claim 9 further comprising:
scoring a secondary element comprised of paper of the one or more secondary elements in multiple locations to create a plurality of score lines by guiding a scoring tool along an edge of the sliding ruler at each location of the multiple locations and applying pressure against the paper secondary element; and
folding the paper secondary element along the plurality of score lines.

12. The method of claim 9, wherein the rectangular work area is substantially 12 inches by 12 inches.

13. The method of claim 9, wherein the first measuring scale is numbered outwardly and in descending order in both directions along the measuring scale from a highest number located substantially at the center of an associated side towards intersections with other sides.

14. The method of claim 13 wherein the first measuring scale also includes numbering ascending upwardly from an intersection with one side to another intersection with another side, the one side and the another side being perpendicular to the associated side.

15. The method of claim 9 further comprising: embossing at least one of the scrapbook paper and paper elements of the one or more secondary elements by placing an embossing template on top of the scrapbook paper or paper elements that have been received on the rectangular work area and applying pressure to the portion of the scrapbook paper or paper elements located inside the template.

16. The method of claim 9 further comprising:
locating a vertical or horizontal placement line on the scrapbook paper using the sliding ruler; and
affixing a plurality of letters that form a word to the scrapbook paper along the placement line.

17. An assembly for use in the craft of scrapbooking, the assembly comprising:
a unitary square frame rule having four sides, each side including (i) a substantially vertical inwardly facing edge, and (ii) a top surface with at least an English measuring scale marked thereon, a first pair of opposing inwardly facing edges and a second pair of inwardly facing edges substantially perpendicular to the first pair, each measuring scale is numbered both outwardly and in descending order from a six inch mark located substantially at the longitudinal center of an associated side and upwardly from a zero mark located substantially at an end of the inwardly facing edge of the associated side;
a base assembly including a rectangular work area, the work area having a substantially flat horizontal surface comprising a self healing mat, the flat horizontal surface being in direct contact with the bottom of each vertical inwardly facing edge, and the flat horizontal surface further having marked thereon (i) a first set of evenly spaced gridlines extending orthogonally between the first pair of inwardly facing edges, (ii) a second set of evenly spaced gridlines extending orthogonally between the second pair of inwardly facing edges, and (iii) a third set of gridlines extending from proximate an intersection of two inwardly facing edges with at least one gridline of the third set extending at an angle of substantially 45 degrees relative to one of the two inwardly facing edges and another gridline of the third set extending at an angle of substantially 30 degrees relative to one of the two inwardly facing edges; and a sliding ruler, at least a portion of the sliding ruler adapted to be received between (i) the first pair of inwardly facing edges to substantially prevent significant longitudinal movement of the sliding ruler in the direction of the sliding ruler's longitudinal axis and permit movement in a direction substantially parallel to the two opposing substantially vertical inwardly facing edges of the associated set, and (ii) the second pair of inwardly facing edges to substantially prevent significant longitudinal movement of the sliding ruler in the direction of the sliding ruler's longitudinal axis and permit movement in a direction substantially parallel to the two opposing substantially vertical inwardly facing edges of the second set.

18. The assembly of claim 17, wherein the length of each inwardly facing edge is substantially 12 inches.

19. The assembly of claim 17 wherein the sliding ruler has an English scale marked thereupon.

\* \* \* \* \*